(12) United States Patent
Cobb

(10) Patent No.: US 6,260,595 B1
(45) Date of Patent: Jul. 17, 2001

(54) UNITIZED HUB CAP

(75) Inventor: Bruce V. Cobb, Livonia, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/366,795

(22) Filed: Aug. 4, 1999

(51) Int. Cl.[7] .................................................. B60C 23/10
(52) U.S. Cl. ......................................... 152/417; 301/108.1
(58) Field of Search .................................. 152/415, 416, 152/417; 301/108.1

(56) References Cited

U.S. PATENT DOCUMENTS

| | | | |
|---|---|---|---|
| 4,498,709 | * | 2/1985 | Wells et al. ............................ 152/417 |
| 4,733,707 | * | 3/1988 | Goodell et al. ........................ 152/417 |
| 4,883,106 | * | 11/1989 | Schultz et al. ......................... 152/417 |
| 4,932,451 | * | 6/1990 | Williams et al. ....................... 152/415 |
| 5,203,391 | * | 4/1993 | Fox ........................................ 152/416 |
| 5,287,906 | | 2/1994 | Stech . |
| 5,377,736 | * | 1/1995 | Stech ..................................... 152/417 |
| 5,429,167 | * | 7/1995 | Jensen .................................... 152/417 |
| 5,538,062 | * | 7/1996 | Stech ..................................... 152/417 |
| 5,584,949 | | 12/1996 | Ingram . |
| 5,769,979 | * | 6/1998 | Naedler ................................. 152/417 |

FOREIGN PATENT DOCUMENTS

| | | | | |
|---|---|---|---|---|
| 2612332 | * | 10/1976 | (DE) | ..................................... 152/416 |
| 3619603 | * | 1/1987 | (DE) | ..................................... 152/417 |
| 492510 | * | 9/1938 | (GB) | ..................................... 152/417 |
| 2178705 | * | 2/1987 | (GB) | ..................................... 152/416 |
| 92/016384 | * | 10/1992 | (WO) | ..................................... 152/417 |

* cited by examiner

Primary Examiner—S. Joseph Morano
Assistant Examiner—Long Bao Nguyen
(74) Attorney, Agent, or Firm—Carlson, Gaskey & Olds

(57) ABSTRACT

A vehicle tire inflation system includes an axle assembly with an axle housing having an air supply conduit. Air is provided to the air supply conduit from an air tank mounted on the vehicle. The axle includes least one wheel hub rotatably supported on the axle housing by bearings. A hub cap is mounted at one end of the wheel hub and has an inlet and an outlet interconnected by a passageway. Air flows from the air supply conduit to the inlet, through the passageway, and out the outlet. At least one pneumatic tire is mounted for rotation with the wheel hub and has a tire inlet. A hose connects the hub cap to the tire to route air from the hub cap outlet to the tire inlet.

6 Claims, 1 Drawing Sheet

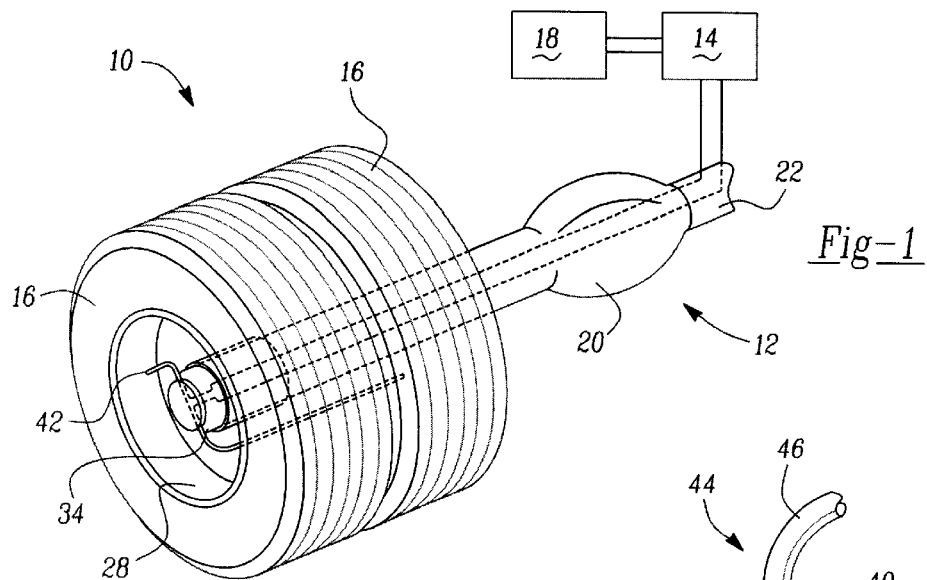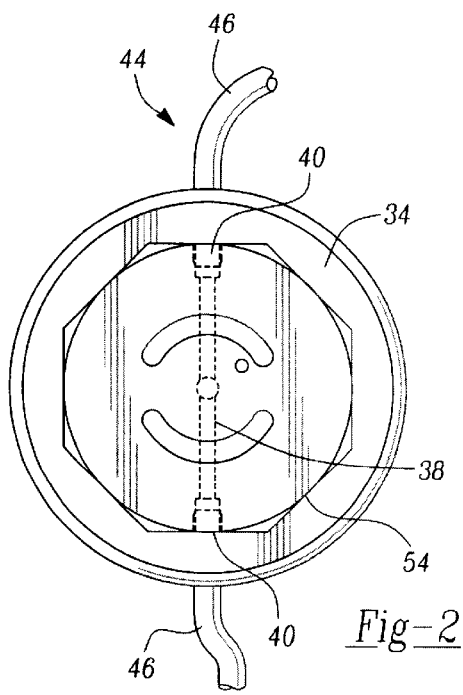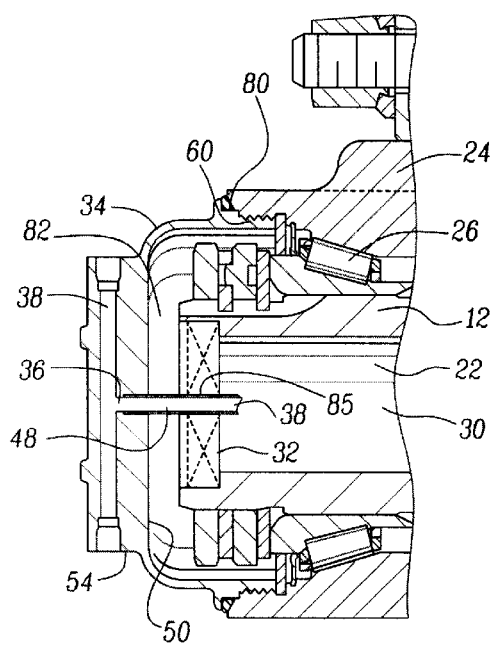

UNITIZED HUB CAP

BACKGROUND OF THE INVENTION

This application relates to a unique hub cap used in wheel end assembly for a tire inflation system. The hub cap includes an internal passageway for routing air from an air supply to the tire.

Tire inflation systems are used on vehicles to automatically supply air to tires when certain conditions are met. In a typical situation, the tire inflation system will automatically add air to a tire that becomes under-inflated during vehicle operation. These tire inflation systems include sensors and pressure regulators for monitoring the pressure in each of the vehicle's tires. When pressure in a tire drops below a predetermined level, the system automatically supplies air to the tire until a desire pressure is achieved.

Some systems include check valves that allow air flow in only one direction, i.e., allow air to flow from the air supply to the tire, so that unwanted tire deflation does not occur. Other systems include valves that control air flow into the tires and out of the tires so that several different tire pressures can be achieved depending upon the type of terrain. Usually the tire inflation systems also include an unloader valve that prevents air from being supplied to a tire if there is a blowout.

The tire inflation systems include an air tank that is mounted on the vehicle. Air is supplied from the tank to the tires in various manners. All of the systems must include a rotary connection that allows air to be supplied to the tires during rotation. Some systems include a rotary valve mounted on one end of the axle. Air is supplied from the tank to the interior of the axle. Air from inside the axle passes through the rotary valve and is conducted to the tires. Another system supplies air via a hub that is rotatable supported on the axle. Rotary seals are used to provide a sealed environment for air conduction.

Hub caps are mounted to the wheel hubs to enclose the wheel end and protect the wheel end components. Many tire inflation systems include fittings that extend outwardly beyond the hub cap. These fittings rotate with the wheel and serve as connections from the hub or axle air supply to the tires. Hoses extend from these fittings to valves on the tires. During vehicle operations, these fittings can be damaged because they extend beyond the hub cap and are exposed to external debris or other hazards. Under certain conditions, such as off-road duty cycles over rough terrain, the fittings can break off causing the tire inflation system to become inoperable.

Thus, it is desirable to have a wheel end assembly for a tire inflation system that does not require fittings extending beyond the hub cap and which provides an air passage from the air supply to the tires that is not easily damaged.

SUMMARY OF THE INVENTION

A vehicle axle assembly for use with a tire inflation system includes an axle housing having an air supply conduit and at least one wheel hub rotatably supported on the axle housing by bearings. A hub cap is mounted at one end of the wheel hub and has an inlet and an outlet interconnected by a passageway. Air flows from the air supply conduit to the inlet, through the passageway, and out the outlet. At least one pneumatic tire is mounted for rotation with the wheel hub and has a tire inlet. A connector assembly connects the hub cap to the tire and has a conduit for routing air from the outlet to the tire inlet.

In the preferred embodiment, the hub cap has a main body with an exterior surface, an interior surface, and an outer edge. A mounting portion is adjacent to the outer edge and is used to attach the hub cap to the wheel hub. The passageway in the hub cap extends from the inlet at the interior surface to the outlet at the outer edge for conducting air through the main body.

By providing a hub cap with an internal passage way for supplying air from the axle to the tire, the present invention eliminates the use of external fittings that extend outwardly beyond the hub cap, and which are easily damaged or broken. Moreover, the use of the unitized hub cap reduces the number of parts required for a tire inflation system and is easily installed and easily maintained.

BRIEF DESCRIPTION OF THE DRAWINGS

FIG. 1 is a perspective view, partially cut-away, of a wheel end assembly incorporating the inventive hub cap.

FIG. 2 is a front view of the hub cap.

FIG. 3 is a cross-sectional view of a wheel end assembly incorporating the hub cap shown in FIG. 2.

DETAILED DESCRIPTION OF THE PREFERRED EMBODIMENT

As shown in FIG. 1, a wheel end assembly 10 is mounted to an axle 12. A tire inflation system, shown schematically at 14, is installed in a vehicle and supplies air to tires 16 when certain pre-determined conditions are met. For example, if a tire pressure falls below a certain level, the tire inflation system 14 can automatically supply air from an air tank 18 to the tire 16 until the desired tire pressure is achieved. The tire inflation system 14 can be any of various systems known in the art.

The wheel end assembly 10 is mounted on one end of the axle 12. It should be understood that the axle 12 has a second wheel end assembly mounted on the opposite end, however, only one wheel end assembly 10 is shown for description purposes. In the preferred embodiment, the axle 12 includes a housing 20 with an internal conduit 22 that routes air from the inflation system 14 through the axle housing 20.

A hub 24 is rotatably mounted on an end of the axle 12 with bearings 26. Rims 28 are mounted to the hub 24 and the tires 16 are mounted on the rims 28. The hub 24 defines an axis of rotation 30 about which the tires 16 rotate. As shown in FIG. 1, the axle 12 has two (2) tires 16 mounted at one end. It should be understood that the subject invention could also be used on an axle configuration where only one tire 16 was mounted on the axle end.

A plug 32 is inserted into one end of the axle 12 to seal an end of the air supply conduit 22. A hub cap 34 is installed on the wheel hub 24 and includes a passageway extending through the body of the hub cap 34. The inflation system 14 supplies air through the air supply conduit 22 through the passageway in the hub cap 34 to the vehicle tires 16.

The passageway is preferably comprised of a first passage 36 defining an inlet 38 that communicates with the air supply conduit 22 and a second passage 38 defining an outlet 40 that communicates with a tire valve 42. Preferably, the hub cap 34 is circular and shape and the second passage 38 extends through the body of the hub cap 34 for a length corresponding to the diameter of the hub cap 34, as shown in FIG. 2.

A connector assembly 44 including hoses 46 is attached to the hub cap 34. The hoses 46 extend to the tire valves 42. Preferably, ends of the hoses are threaded directly into the hub cap 34, however, other connecting methods known in the art could also be used. As discussed above, for an axle 12 with two tires 16 mounted at each end, one hose 46 leads to the first tire 16 while the other hose 16 leads to the second tire 16 mounted on the wheel end assembly 10. Thus, in this configuration, the second passage 38 has two outlets 40, one for each tire 16.

As shown in more detail in FIG. 3, the wheel end assembly 10 includes the wheel hub 24 that is rotatably supported on the axle 12 with the air supply conduit 22. The hub cap 34 is mounted for rotation with the wheel hub 24 and includes the passageway with an inlet 37 communicating with the air supply conduit 22. Air flows from the supply conduit 22, through the passageway to the outlet 40.

The first passage 36 has the inlet 37 at one end and the second passage 38 extends radially outwardly from the first passage 36 to the outlet 40. In the preferred embodiment a tube 48 is inserted partially into the first passage 36. One end of the tube 48 is inserted into the hub cap 34 and the opposite end of the tube 48 is inserted into the plug 32. The tube 48 spins on an O-ring (not shown) mounted in the plug 32. The tube 48 can be press-fit or glued into the hub cap 34, or other methods known in the art could be used to attach the tube 48 and hub cap 34. The inlet 37 is formed at one end of the tube 48 and air flows from the supply conduit 22, through the tube 48, into the first passage 36, through the second passage 38, through the hoses 46 and into the tires 16.

The hub cap 34 has an interior surface 50, an exterior surface 52 and an outer edge 54. Preferably, the first passage 36 is centrally located within the hub cap 34 and is concentric with the axis of rotation 34. The second passage 38 extends from the first passage 36 to an outer edge 54 of the hub cap 34. When one tire 16 is mounted to the axle 12 only one outlet 40 located at the edge 54 of the hub cap 34 is needed, however, when two (2) tires 16 are mounted to the axle, two (2) outlets 40 are needed. In the two tire 16 configuration, the second passage 38 is comprised of a first portion 38a extending to one outlet 40 and a second portion 38b extending to the other outlet 40.

The first passage 36 defines a first longitudinal axis 58 that is parallel to the axis of rotation 30. As discussed above, in the preferred embodiment the first passage 36 has a center located on the axis of rotation 30 such that the longitudinal axis 58 and the axis of rotation 30 are collinear. It should be understood that the first passage 36 could also be located above or below the axis of rotation 30.

Preferably, the first passage 36 has a first length and the second passage 38 has a second length that is greater than the first length. The second passage defines a second longitudinal axis 56 that is transverse to the first longitudinal axis 58. In the preferred embodiment, the second longitudinal axis 56 is perpendicular to the first longitudinal axis 58 and extends along the diameter of the hub cap 34. While a perpendicular orientation is preferred, it should be understood that the second passage 38 could be mounted at any angle with respect to the first passage. Or, optionally, a single straight or slight curved passageway could extend from the inlet 38 directly to the outlet 40.

As shown in FIG. 3, the hub cap 34 includes a mounting portion 60 adjacent to the outer edge 54 for attaching the hub cap 34 to the hub 24. The mounting portion 34 includes threads 62 for engaging threads 64 on the hub 24. Alternatively, the hub cap could be attached to the hub 24 with fasteners (not shown) or other means known in the art. A vent hole 66 is also provided to vent air from the wheel end assembly 10.

The hub cap 34 is preferably cast as a single piece from steel, however, other known manufacturing methods could be used. While is the preferred material, it should be understood that the hub cap 34 could be formed from aluminum, plastic, fiberglass, or other materials.

The use of internal passages 36, 38 in the hub cap 34 eliminates the need for external fittings to route air to the tires 16. These fittings were easily damaged during vehicle operation. By using the subject hub cap 34 with internal air passages 34, 36 maintenance costs and downtime are decreased.

As can be seen from FIG. 3, a contact area 80 between the hubcap 34 and the hub 24 is axially inward of a space 82 between the hubcap and an outer end of the axle 12. Moreover, a point 85 where the tube 38 initially extends into the seal 32 is axially outward of the contact area 80. In this way, the hubcap is truly a hubcap, and extends to the passage 38 further axially outward than was the case in the prior art.

Preferred embodiments of this invention have been disclosed, however, a worker of ordinary skill in the art would recognize that certain modifications would come within the scope of this invention. For that reason the following claims should be studied to determine the true scope and content of this invention.

What is claimed is:

1. A vehicle axle assembly for use with a tire inflation system comprising:
    an axle housing having an air supply conduit;
    at least one wheel hub rotatably supported on said axle housing by bearings;
    a hub cap mounted at one end of said wheel hub and having an inlet and an outlet interconnected by a passageway wherein air flows from said air supply conduit to said inlet, through said passageway, and out said outlet, said hub cap having a face in abutting contact with an outer face of said wheel hub at a first axial location, there being a space between said hub cap and an outer end of said axle housing at a second axial location, and said wheel hub having said air supply extending into a seal within said axle housing, said air supply conduit extending into said seal at a third axial location, said third axial location being intermediate said first and second axial location, such that said hub cap moves the location of said outlet further axially outwardly away from said wheel hub;
    at least one pneumatic tire mounted for rotation with said wheel hub and having a tire inlet; and
    a connector assembly connecting said hub cap to said tire and having a conduit for routing air from said outlet to said tire inlet.

2. An assembly as set forth in claim 1 wherein said passageway extends from an interior surface of said hub cap to an exterior outer edge of said hub cap.

3. An assembly as set forth in claim 2 wherein said passageway is comprised of a first passage extending from said inlet to a second passage extending transversely from said first passage to said outlet located at said outer edge.

4. An assembly as set forth in claim 3 wherein said first passage has a first length and said second passage has a second length that is greater than said first length.

5. An assembly as set forth in claim 4 wherein said first passage defines a first longitudinal axis and said second passage defines a second longitudinal axis that is generally perpendicular to said first longitudinal axis.

6. An assembly as set forth in claim 1 wherein said hub cap includes a tube interconnecting said air supply conduit and said inlet.

* * * * *